US012256077B2

(12) United States Patent
Peringassery Krishnan et al.

(10) Patent No.: US 12,256,077 B2
(45) Date of Patent: Mar. 18, 2025

(54) SYSTEMS AND METHODS FOR REGULARIZATION-FREE MULTI-HYPOTHESIS ARITHMETIC CODING

(71) Applicant: Tencent America LLC, Palo Alto, CA (US)

(72) Inventors: Madhu Peringassery Krishnan, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 190 days.

(21) Appl. No.: 18/121,432

(22) Filed: Mar. 14, 2023

(65) Prior Publication Data

US 2023/0308651 A1    Sep. 28, 2023

Related U.S. Application Data

(60) Provisional application No. 63/322,411, filed on Mar. 22, 2022.

(51) Int. Cl.
*H04N 19/13* (2014.01)
*H04N 19/70* (2014.01)
*H04N 19/91* (2014.01)

(52) U.S. Cl.
CPC .............. *H04N 19/13* (2014.11); *H04N 19/70* (2014.11); *H04N 19/91* (2014.11)

(58) Field of Classification Search
CPC ........ H04N 19/13; H04N 19/70; H04N 19/91; H04N 19/51; H04N 19/593; H04N 19/61; H04N 19/82
See application file for complete search history.

(56) References Cited

U.S. PATENT DOCUMENTS

| 11,336,892 B2 * | 5/2022 | Zakharchenko ....... H04N 19/46 |
| 2012/0328207 A1 * | 12/2012 | Sasai ..................... H04N 19/91 |
| | | 382/233 |

(Continued)

FOREIGN PATENT DOCUMENTS

| WO | WO-2023163807 A1 * | 8/2023 | .......... H03M 7/3079 |
| WO | WO-2023163808 A1 * | 8/2023 | .......... H03M 7/3079 |

OTHER PUBLICATIONS

"Division-free Probability Regularization for Arithmetic Coding", 8 pgs.

(Continued)

*Primary Examiner* — Maria E Vazquez Colon
(74) *Attorney, Agent, or Firm* — Morgan, Lewis & Bockius LLP

(57) ABSTRACT

The various embodiments described herein include methods and systems for coding video. In one aspect, a method includes obtaining video data including a syntax element with a corresponding alphabet of M elements, a first set of respective probabilities of occurrence for the M elements of the syntax element; and a second set of respective probabilities of occurrence for the M elements of the syntax element. The method further includes entropy coding a first portion of the video data in accordance with an aggregation of the first and second sets; and, while entropy coding the first portion of the video data, encountering a first syntax element. The method also includes updating the first set at a first rate and updating the second set at a second rate, faster than the first rate. The method further includes adaptively entropy coding a second portion of the video data.

20 Claims, 7 Drawing Sheets

(56) References Cited

U.S. PATENT DOCUMENTS

2018/0192053 A1*  7/2018  Zhou .................. H04N 19/13
2020/0169733 A1   5/2020  George et al.
2020/0366906 A1  11/2020  Winken et al.
2021/0211743 A1   7/2021  Kirchhoffer et al.

OTHER PUBLICATIONS

Tencent Technology, ISRWO, PCT/US2023/015306, Jun. 14, 2023, 9 pgs.

* cited by examiner

SYSTEMS AND METHODS FOR REGULARIZATION-FREE MULTI-HYPOTHESIS ARITHMETIC CODING

RELATED APPLICATIONS

This application claims priority to U.S. Provisional Patent Application No. 63/322,411, entitled "Regularization-Free Multi-Hypothesis Arithmetic Coding" filed Mar. 22, 2022, which is hereby incorporated by reference in its entirety.

TECHNICAL FIELD

The disclosed embodiments relate generally to video coding, including but not limited to systems and methods for multi-hypothesis arithmetic coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and/or decoder can utilize techniques from several broad categories and steps, including, for example, motion compensation, Fourier transform, quantization, and entropy coding. During entropy coding, data about operations may be sent to an entropy encoder. The entropy encoder may output a bitstream (a coded video sequence), which may be transmitted to another device via a transmission channel During video decoding process, a bitstream may be sent to an entropy decoder. The entropy decoder may output, based on the bitstream, data about operations, which may include intra prediction information, residue information, and the like. In some embodiments, the entropy coding/decoding utilizes an arithmetic coding algorithm based on probability of occurrence of symbols (or characters) as basis for arithmetic coding. In some embodiments, the probability of occurrence of the symbols (or characters) is updated dynamically during the coding/decoding process. For example, there are only two possible characters ("a" and "b"), a probability of an "a" occurrence is denoted as $p\_a$, and a probability of a "b" occurrence is denoted as $p\_b$, and then $p\_a+p\_b=1$ (or any other constant value). Thus, when the "a" is encountered in the coding/decoding process, $p\_a$ may be updated to a larger value; and $p\_b$ may be updated to a smaller value because their summation may be constant. This probability updating process may be referred to as a "probability transition process" or a "probability state index updating process."

In accordance with some embodiments, a method of video coding is provided. The method includes: (i) obtaining video data comprising a plurality of syntax elements, the plurality of syntax elements including a first syntax element with a corresponding alphabet of M elements; (ii) obtaining a first set of respective probabilities of occurrence for the M elements of the first syntax element; (iii) obtaining a second set of respective probabilities of occurrence for the M elements of the first syntax element; (iv) entropy coding a first portion of the video data in accordance with an aggregation of the first and second sets; (v) while entropy coding the first portion of the video data, encountering the first syntax element; (vi) updating the first set by determining updated probabilities of occurrence for the M elements in the first set in accordance with the first syntax element, where the first set is updated at a first rate; (vii) updating the second set by determining updated probabilities of occurrence for the M elements in the second set in accordance with the first syntax element, where the second set is updated at a second rate, faster than the first rate; (viii) in accordance with at least one of the updated probabilities in the second set being less than a threshold probability value, entropy coding a second portion of the video data in accordance with a first aggregation of the updated first and second sets; and (ix) in accordance with each of the updated probabilities in the second set being at least the threshold probability value, entropy coding the second portion of the video data in accordance with a second aggregation of the updated first and second sets.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes regularization-free multi-hypothesis arithmetic coding for entropy encoding/decoding. For example, a minimum probability is defined and, as each syntax element probability is updated, the updated probability is compared to the minimum probability. In this example, if an updated probability is less than the minimum probability, then a different hypothesis is used, or a different weighting is applied to the multiple hypotheses. In this way, a final (combined) probability for each syntax element is prevented from approaching zero, which reduces encoding inefficiencies, prevents Bjontegaard delta (BD) rate losses, and/or reduces modeling errors. Moreover, the regularization-free approaches described herein reduce/eliminate the calculation costs associated with performing division operations during the regularization process.

Example Systems and Devices

Figure 1:
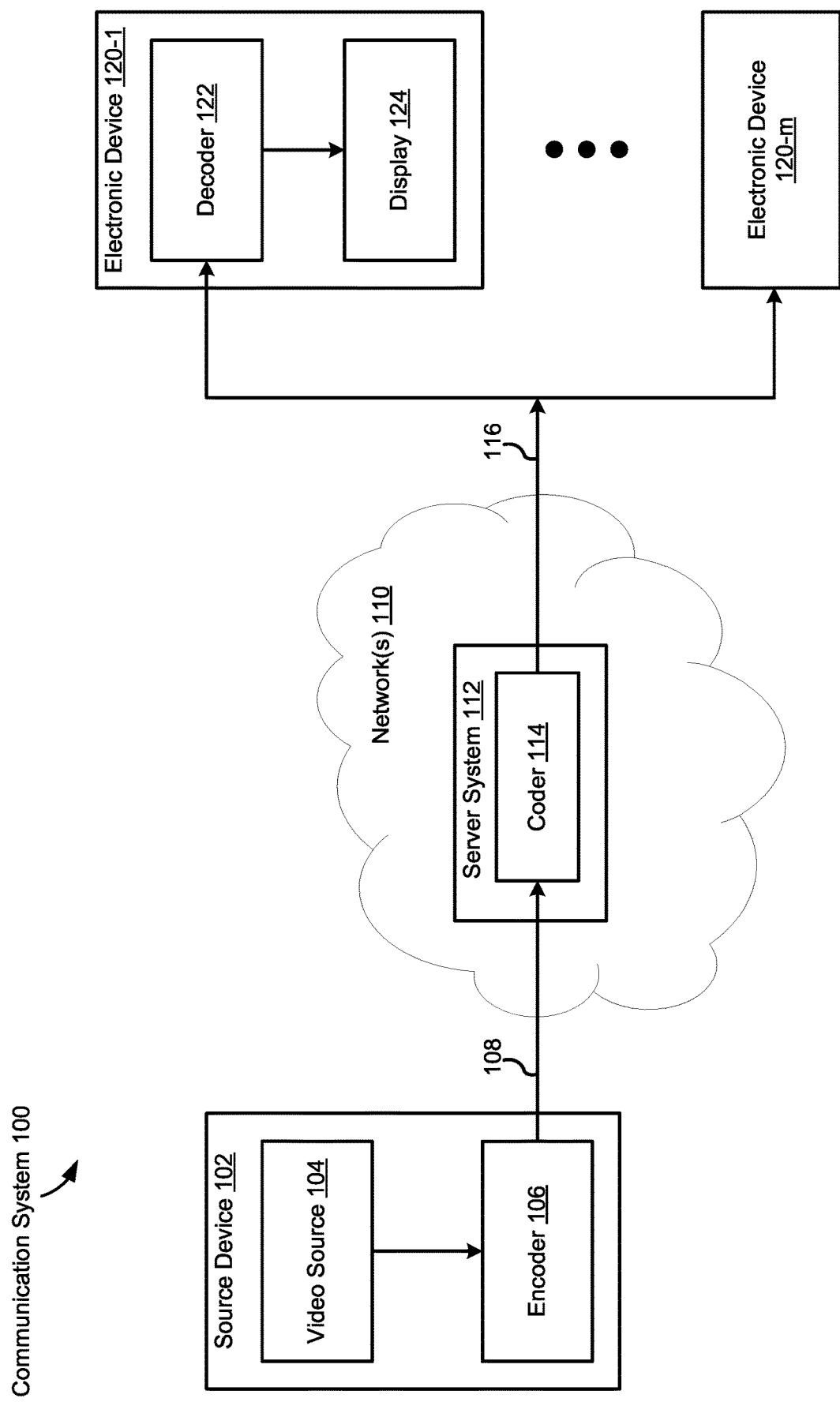
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-$m$) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
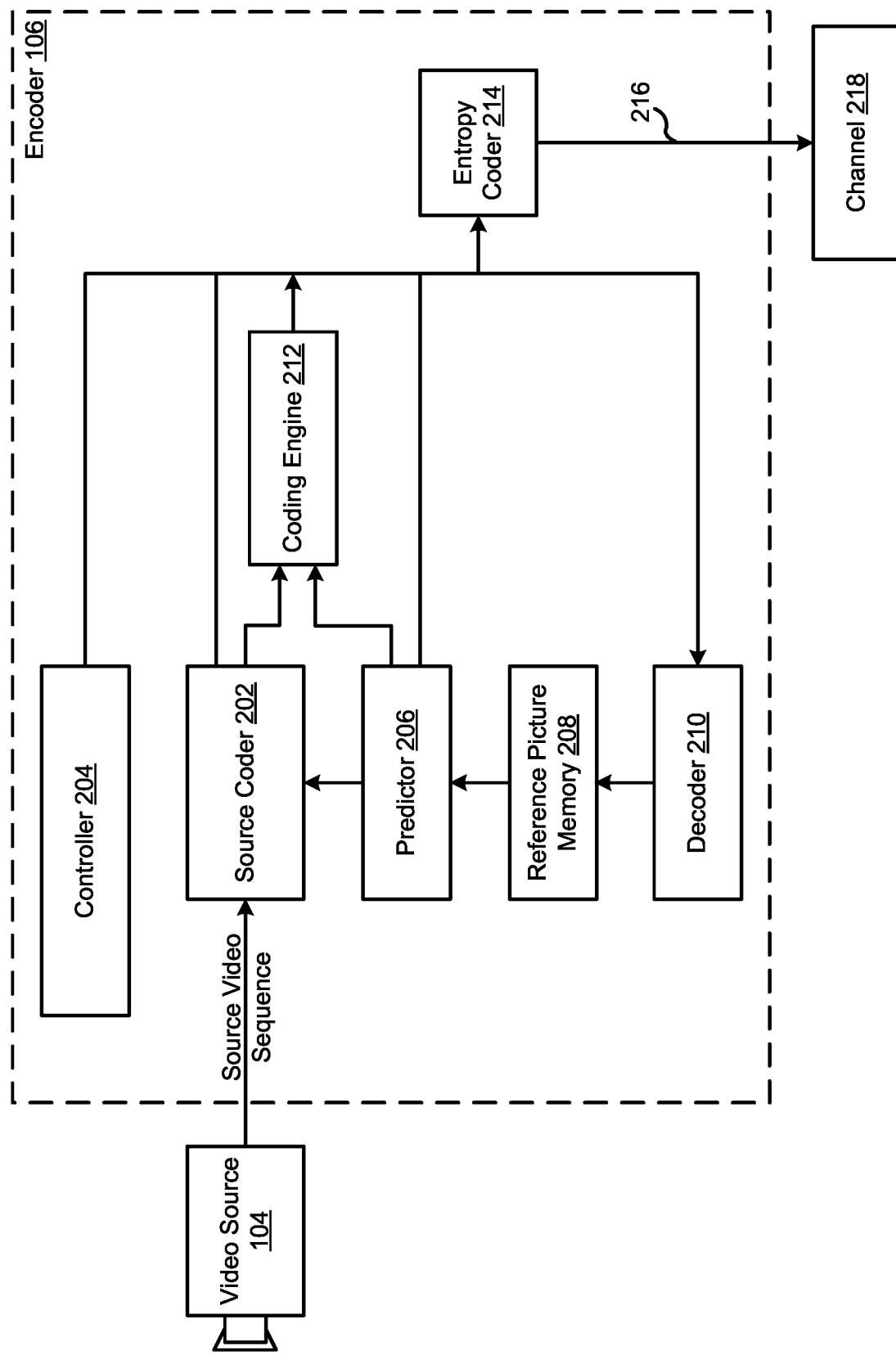
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
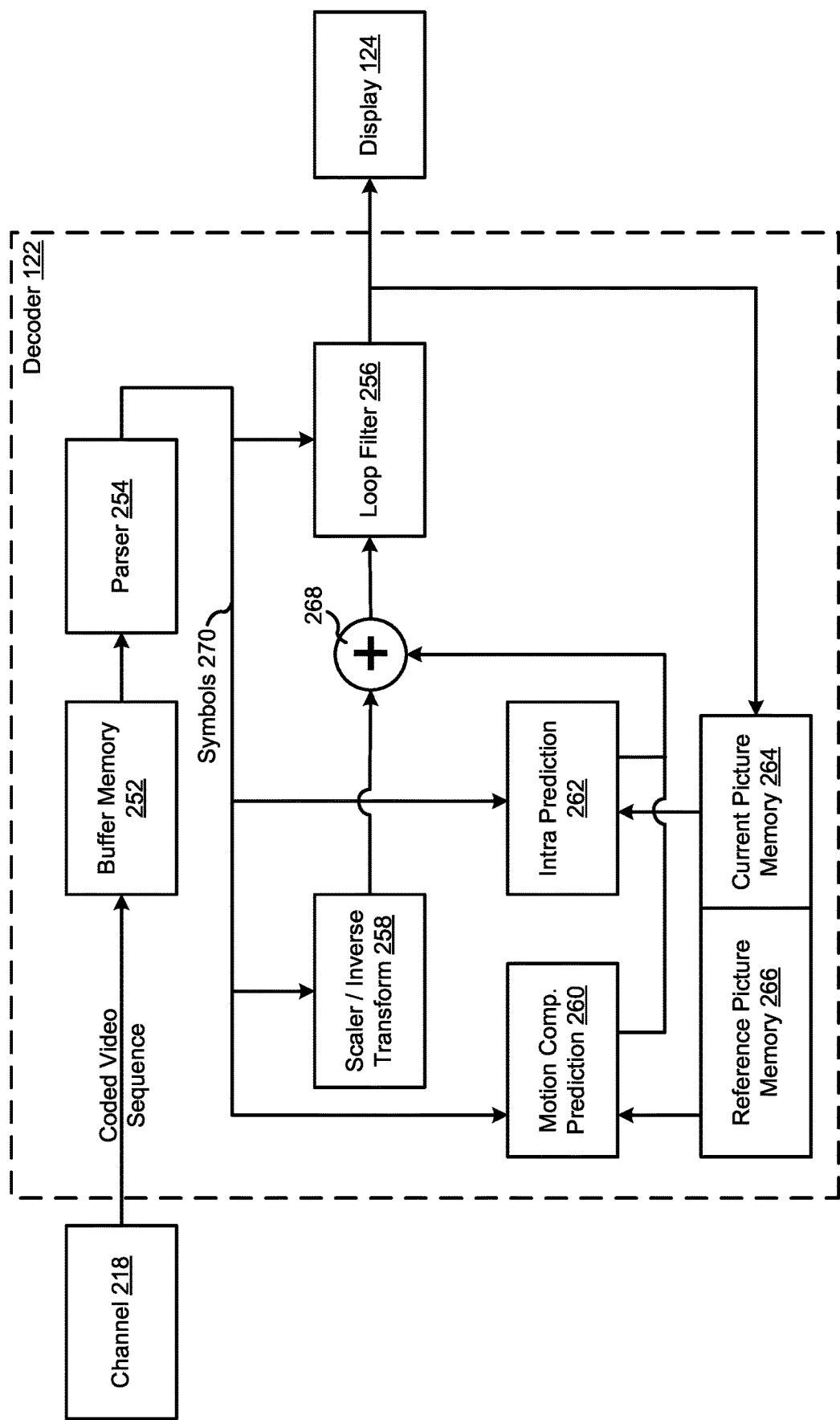
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter unit 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing) When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
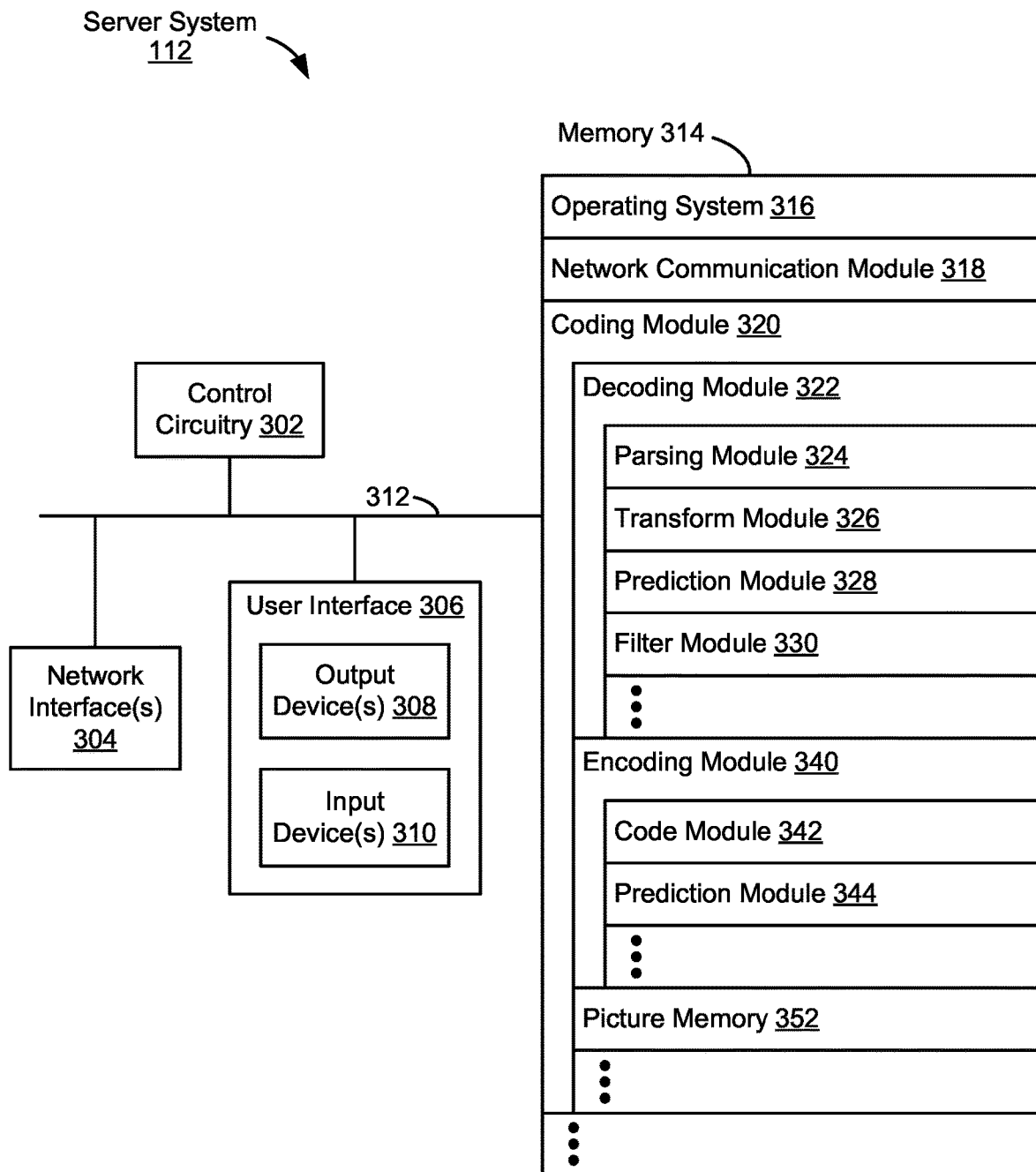
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
    - a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter unit 256).

In some embodiments, the encoding module 340 includes a code module 342 (e.g., configured to perform the various functions described previously with respect to the source coder 202, the coding engine 212, and/or the entropy coder 214) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Entropy Encoding

As mentioned previously, during entropy coding, data about operations may be sent to an entropy encoder (e.g., the entropy coder 214). The entropy encoder may output a bitstream, which may be transmitted to another device via a transmission channel During video decoding process, a bitstream may be sent to an entropy decoder. The entropy decoder can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by an intra decoder or an inter decoder, residual information in the form of, for example, quantized transform coefficients, and the like For example, in HEVC, an entropy coder/decoder may use a context adaptive binary arithmetic coding (CABAC) algorithm. The CABAC engine in HEVC uses a table-based probability transition process between 64 different representative probability states.

Syntax elements describing a video frame content can be subjected to binary arithmetic coding to obtain an encoded stream as a binary bin stream. During CABAC, an initial interval [0,1) may be stretched by an integer multiplier (e.g., 512), a probability of a least probable symbol (pLPS) may be presented as an integer divisor by rounding off their quotient. Then, interval splitting operations with a typical arithmetic coding may be performed as approximate computations using integer arithmetic with a specified resolution.

An updated interval length corresponding to LPS (rLPS) may be computed as rLPS=R*pLPS, where R is a value of the current interval length. To save time and increase efficiency, the above computationally intensive multiplication operation may be replaced by a lookup table (LUT) populated with pre-computed multiplication results; and thus, an updated interval length corresponding to LPS (ivLpsRange) may be obtained by two indexes pStateIdx and qRangeIdx, e.g., ivlLpsRange=rangeTabLps[pStateIdx][qRangeIdx].

During encoding/decoding, the probability value pLPS may be updated recursively each time a new value of the bin to be encoded/decoded (binVal) is obtained. For example, at the kth step (that is, during the encoding or decoding of the kth bin), the new value of pLPS may be computed to be a larger value when the binVal is the value of LPS; or the new value of pLPS may be computed to be a smaller value when the binVal is the value of most probable symbol (MPS).

In some embodiments, pLPS may be one of 64 possible values that are indexed by the 6-bit pStateIdx variable. Updating the probability value may be achieved by updating the index pStateIdx, which may be carried out by looking up values from pre-computed tables, to save computing power and/or to improve efficiency.

In some embodiments, a range ivlCurrRange representing the state of the coding engine may be quantized to a set of 4 values prior to the calculation of the new interval range. The state transition may be implemented using a table containing all 64×4 8-bit pre-computed values to approximate the values of ivlCurrRange*pLPS(pStateIdx). Also, a decode decision may be implemented using a pre-computed LUT. First ivlLpsRange is obtained using the LUT, and then, ivlLpsRange is used to update ivlCurrRange and calculate the output binVal.

Figure 4:
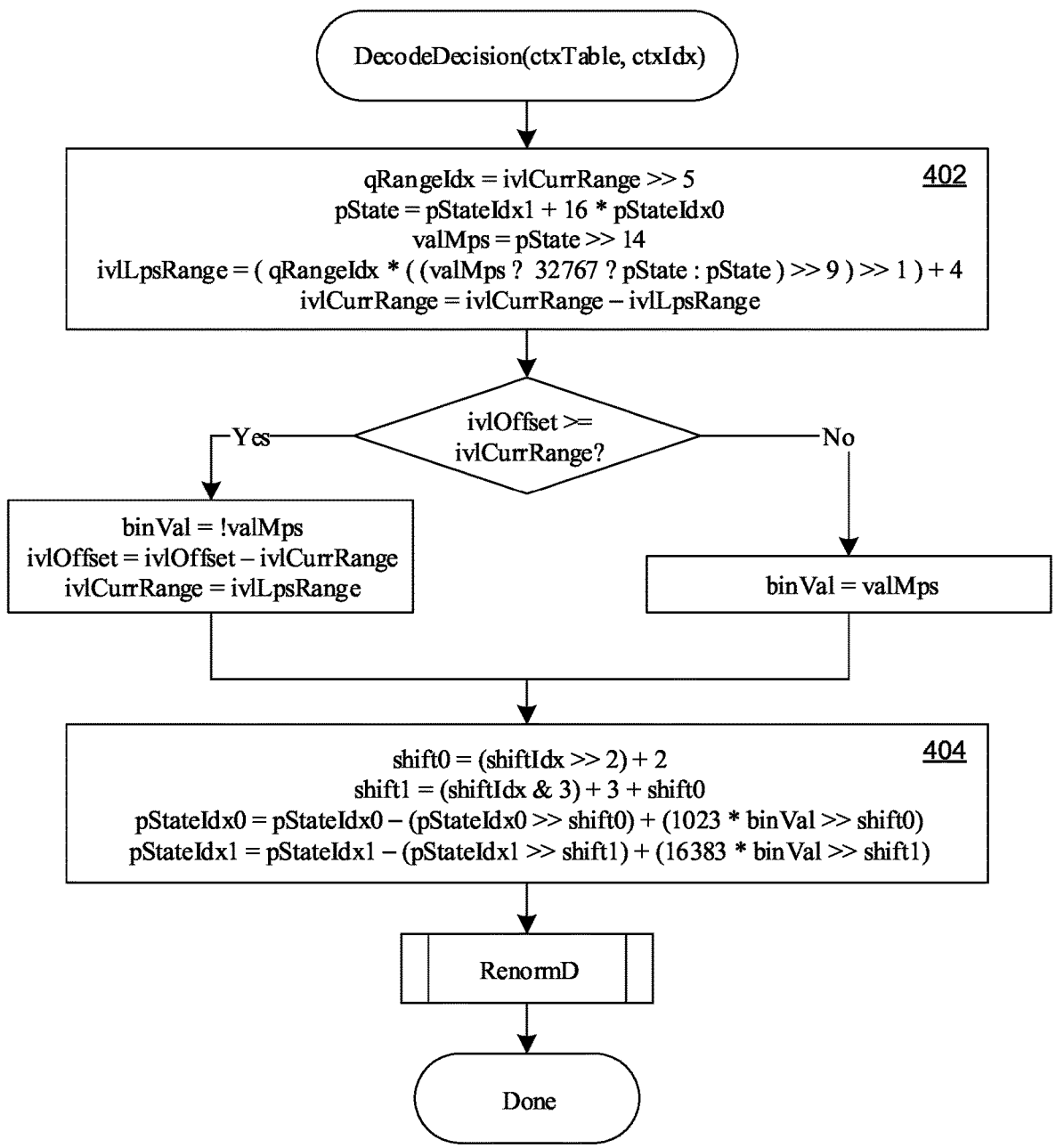
FIG. 4 is a flow diagram illustrating an example flow for decoding a binary decision.

As an example, in VVC, the probability may be linearly expressed by the probability index pStateIdx. Therefore, all the calculation may be done with equations without a LUT operation. To improve the accuracy of probability estimation, a multi-hypothesis probability update model may be used, as illustrated in FIG. 4. In this example, the pStateIdx used in the interval subdivision in the binary arithmetic coder is a combination of two probabilities pStateIdx0 and pStateIdx1. The two probabilities are associated with each context model and are updated independently with different adaptation rates. The adaptation rates of pStateIdx0 and pStateIdx1 for each context model can be pre-trained based on the statistics of the associated bins. The probability estimate pStateIdx can be the average of the estimates from the two hypotheses.

FIG. 4 is a flow diagram illustrating an example flow for decoding a single decision (DecodeDecision), including a renormalization process in the arithmetic decoding engine (RenomD). In some embodiments, the input to DecodeDecision is a context table (ctxTable) and a context index (ctxIdx). A value of the variable ivlLpsRange is derived as shown in 402. Given the current value of ivlCurrRange, the variable qRangeIdx is derived as qRangeIdx=ivlCurrRange>>5. Given qRangeIdx, pStateIdx0 and pStateIdx1 associated with ctxTable and ctxIdx, valMps and ivlLpsRange are derived as pState=pStateIdx1+16*pStateIdx0; valMps=pState>>14; and ivlLpsRange=(qRangeIdx*((valMps?32767−pState:pState)>>9)>>1)+4. The variable ivlCurrRange is set to be ivlCurrRange−ivlLpsRange.

When ivlOffset is greater than or equal to ivlCurrRange, the variable binVal is set equal to 1−valMps, ivlOffset is decremented by ivlCurrRange, and ivlCurrRange is set equal to ivlLpsRange; otherwise, the variable binVal is set equal to valMps.

For updating the probability, during state transition process, inputs to this process are the current pStateIdx0 and pStateIdx1, and the decoded value binVal; and outputs of this process are the updated pStateIdx0 and pStateIdx1 of the context variable associated with ctxTable and ctxIdx. The variables shift0 and shift1 are derived from the shiftIdx value associated with ctxTable and ctxIdx in 402: shift0= (shiftIdx>>2)+2; and shift1=(shiftIdx & 3)+3+shift0; and depending on the decoded value binVal, the update of the two variables pStateIdx0 and pStateIdx1 associated with ctxTable and ctxIdx is derived as pStateIdx0=pStateIdx0−(pStateIdx0>>)shift0+(1023*binVal>>)shift0 and pStateIdx1=pStateIdx1−(pStateIdx1>>shift1)+(16383*binVal>>shift1).

As an example, a VVC CABAC may have a quantization parameter (QP) dependent initialization process invoked at the beginning of each slice. Given the initial value of luma QP for the slice, the initial probability state of a context model, denoted as preCtxState, may be derived by: m=slopeIdx×5−45, n=(offsetIdx<<3)+7; and preCtxState=Clip3 (1,127, ((m×(QP−32))>>4)+n).

In some embodiments, the slopeIdx and offsetIdx are restricted to 3 bits, and total initialization values are represented by 6-bit precision. The probability state preCtxState may represent the probability in the linear domain directly. Hence, preCtxState may only need proper shifting operations before input to arithmetic coding engine, and the logarithmic to linear domain mapping as well as the 256-byte table may be predefined and stored/saved in memory. The pStateIdx0 and pStateIdx1 may be obtained by pStateIdx0=preCtxState<<3; and pStateIdx1=preCtxState<<7.

In some embodiments, CABAC algorithms may use a binary basis, which include two possible characters/symbols (e.g., "0" and "1"). In a binary-based arithmetic coding algorithm, the two possible characters/symbols may also be denoted as the least probable symbol (LPS) and the most probable symbol (MPS).

In some embodiments, an entropy encoder or decoder may use an arithmetic algorithm with an M-ary basis, which include M possible characters/symbols. For example, M may be any integer value between 2 and 16. For example, when M is equal to 5, the M-ary basis includes 5 possible characters/symbols, which may be represented as "0", "1", "2", "3", and "4".

The M-ary arithmetic coding engine is used for entropy coding the syntax elements. Each syntax element is associated with an alphabet of M elements. As input to the encoder or the decoder, a coding context may include a sequence of M-ary symbols with a set of M probabilities. Each of the M probabilities may correspond to each of the M-ary symbols; and may be represented by a cumulative distribution function (CDF).

The cumulative distribution functions for M-ary symbols can be denoted as $C=[c_0, c_1, \ldots, c_{(M-2)}, c_{(M-1)}]$. The cumulative distribution functions for M-ary symbols may be represented by an array of M 15-bit integers, where $c_{(M-1)}=2^{15}$, $c_n/32768$ is the probability of the symbol being less than or equal to n, and n is an integer from 0 to M−1.

In some embodiments, the M probabilities (e.g., the array of cumulative distribution functions) are updated after coding/parsing each syntax element. In some embodiments, the M probabilities are updated after coding/decoding each M-ary symbol. For example, when M=4, the array of cumulative distribution functions includes $[c_0, c_1, c_2, c_3]$.

In some embodiments, the update of the M probabilities is performed in accordance with the following equations:

$$\begin{cases} c_m = c_m \cdot (1-\alpha) & m \in [0, \text{symbol}) \\ c_m = c_m + \alpha \cdot (1-c_m) & m \in [\text{symbol}, M-1) \end{cases}$$

where symbol is the presently being-coded/decoded M-ary symbol, a is the probability update rate that adapts based on the number of times the symbol has been coded or decoded (e.g., up to a maximum of 32) and m is the index of the element in the CDF. This adaptation of a may allow for faster probability updates at the beginning of coding/parsing the syntax elements. For example, when M=5 and presently being decoded M-ary symbol is "3", m∈ [0, symbol) may be m∈ [0, 3) with m including any integer between 0, inclusive, and 3, exclusive; and m∈ [symbol, M−1) may be m∈ [3, 4) with m including any integer between 3, inclusive, and 4, exclusive.

In some embodiments, the M-ary arithmetic coding process may follow the conventional arithmetic coding engine design; however, only the most significant 9 bits of the 15-bit probability values are input to the arithmetic encoder/decoder. The probability update rate α associated with a symbol is calculated based on the number of appearances for the associated symbol when parsing a bitstream and the value of $\alpha$ is reset using the following formula at the beginning of a frame or a tile.

As an example, $\alpha = \frac{1}{2}8+(count>15)+(count>32)+min\ (log_2(M),2)$, where the count is the number of appearances for the associated symbol when coding/parsing a bitstream. As indicated by the above equation, the probability update rate has a greater value at the beginning (when the count is relatively small, for example, 16) and then saturates later (when the count is relatively large, for example, after 32 appearances, or 40).

Updating the rate $\alpha$ can lead to a strongly biased distribution with certain symbol probabilities reducing close to zero. Probabilities close to zero can result in BD rate losses. To counter this effect a regularization approach may be used, where at the end of each probability update if the probability ($p_m$) is less than a threshold ($P_{thr}$), a regularization term is applied to all probabilities so that $p_m$ is moved to $P_{thr}$. The regularization term may be taken from a uniform distribution and may depend on the sample space of the syntax element.

Figures 5A, 5B:
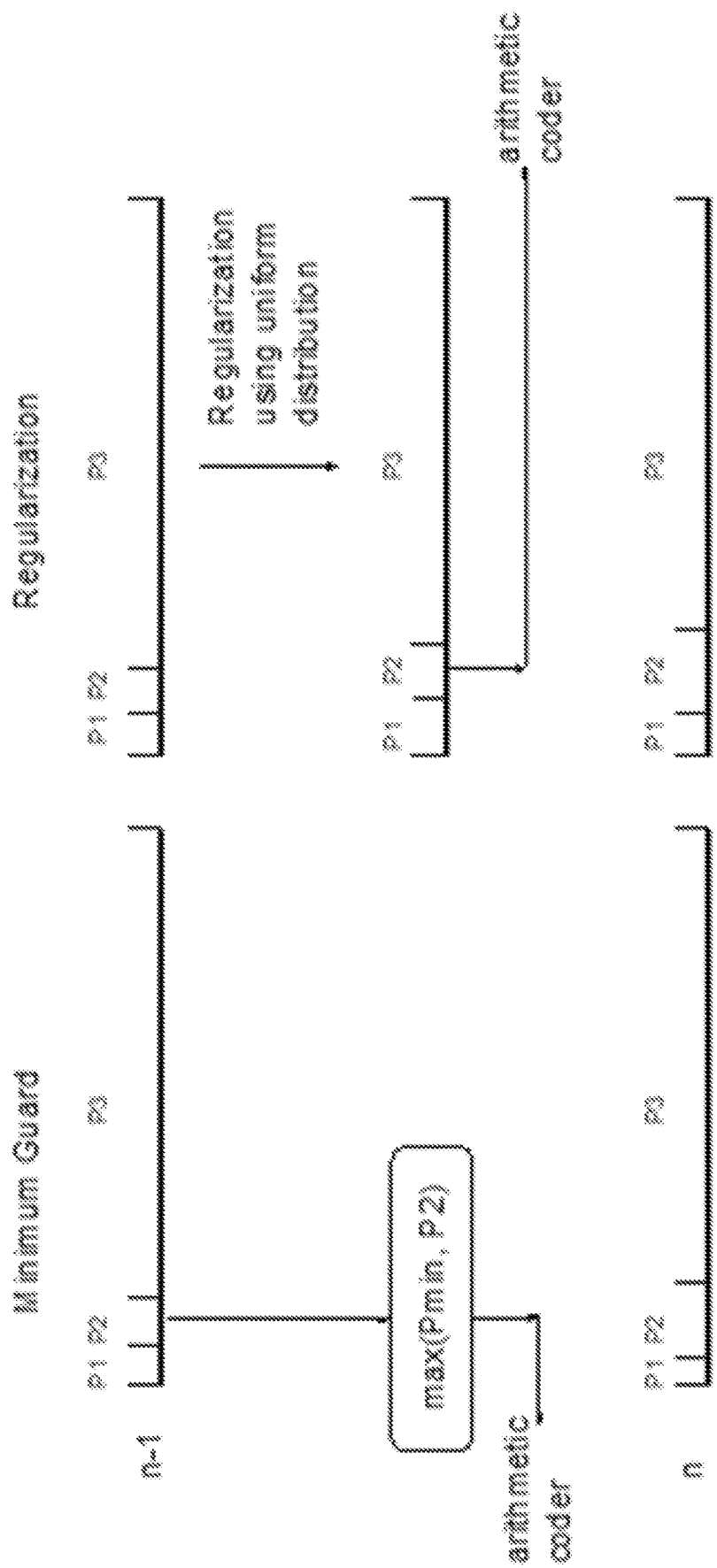
FIGS. 5A-5B are diagrams illustrating example approaches of enforcing minimum probabilities in accordance with some embodiments.

FIGS. 5A-5B are diagrams illustrating example approaches of enforcing minimum probabilities in accordance with some embodiments. As an example, in AV1, a minimum probability $P_{min}$ is applied to guard the probability fed to the arithmetic coding (sometimes referred to as a "minimum guard" approach), as illustrated in FIG. 5A. In the minimum guard approach shown in FIG. 5A, the subsequent model update increases $p_2$ in stage n, it further pushes $p_1$ towards 0, which can potentially incur coding efficiency loss in the presence of model error.

Regularization can be used as an alternative to the minimum guard approach and is illustrated in FIG. 5B. For example, at the end of an update, if there is a probability, say $p_m$, that goes below $P_{min}$ a uniform distribution can be applied as a regularization term to adjust all the probabilities simultaneously.

The CDF of the M-ary uniform distribution can be defined as $$\overline{C}^u = [c_1^u, c_2^u, \ldots, c_{M-1}^u, 1] = \left[\frac{1}{M}, \frac{2}{M}, \ldots, \frac{M-1}{M}, 1\right].$$

In this way, the regularization moves move $p_m$ back to $P_{min}$ through $$\hat{p}_m = \frac{p_m + \alpha \frac{1}{M}}{1+\alpha} = P_{min},$$

which leads to $$\alpha = \frac{P_{min} - p_m}{\frac{1}{M} - P_{min}}.$$

The update rate $\alpha$ can be approximated as $MP_{min}$, since $P_{min} \ll 1/M$ and that one could allow $\hat{p}_m$ to be slightly above $P_{min}$. This translates into a CDF regularization of $$\hat{C}_n = \frac{\overline{C}_n + \alpha \overline{C}^u}{1+\alpha}.$$

As is apparent, calculating either the $\alpha$ or the $\hat{C}_n$ using these equations involves a division operation.

A multi-hypothesis probability model for encoding an M-ary symbol may be used with only a single probability model being used by the encoder/decoder. For example, a data adaptive model may be used for probability updates, where the update rate is higher with fewer occurrence of a syntax element and is lower with more observations. A multi-hypothesis estimation, where each syntax element maintains two or more probability tables of different update rates, can bring additional compression efficiency. A multi-hypothesis probability model may be used with two update rates, such as $\alpha_1$ and $\alpha_2$ below.

$$\alpha_1 = \frac{1}{2^{4+(count>15)+(count>31)+min(log_2(M),2)}}$$

$$\alpha_2 = \frac{1}{2^{2+(count>7)+(count>15)+min(log_2(M),2)}}$$

where $\alpha_2$ models a faster update while $\alpha_1$ a slower update. The probability model may use a linear combination of $\alpha_1$ and $\alpha_2$. For example, an average of two hypotheses may be used.

Figure 6:
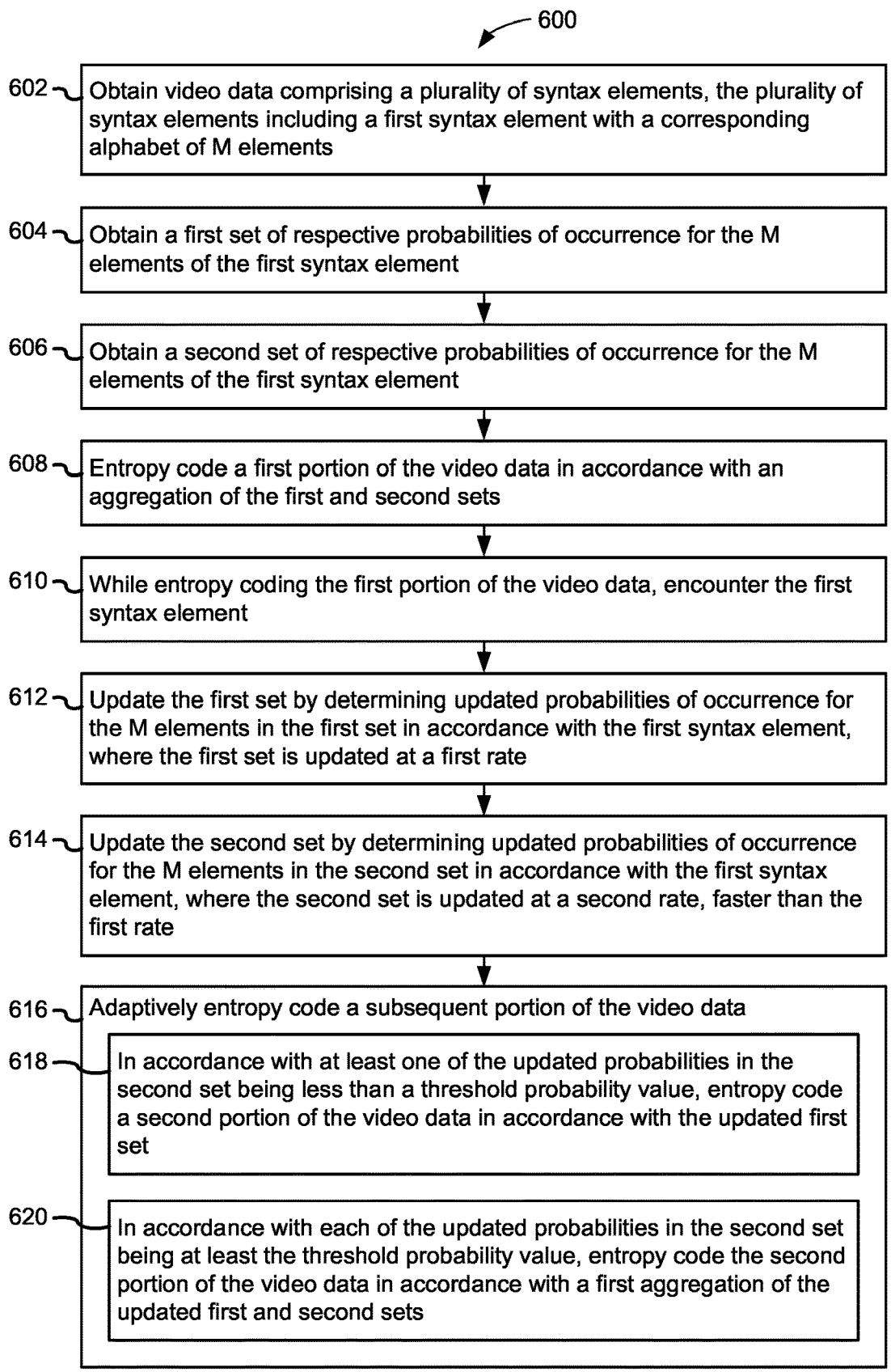
FIG. 6 is a flow diagram illustrating an example method of coding video in accordance with some embodiments.

FIG. 6 is a flow diagram illustrating a method 600 of coding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system obtains (602) video data comprising a plurality of syntax elements, the plurality of syntax elements including a first syntax element with a corresponding alphabet of M elements. The system obtains (604) a first set of respective probabilities of occurrence for the M elements of the first syntax element. The system obtains (606) a second set of respective probabilities of occurrence for the M elements of the first syntax element. The system entropy codes (608) a first portion of the video data in accordance with an aggregation of the first and second sets. While entropy coding the first portion of the video data, the system encounters (610) a first syntax element. The system updates (614) the first set by determining updated probabilities of occurrence for the M elements in the first set in accordance with the first syntax element, where the first set is updated at a first rate. The system adaptively entropy codes (616) a subsequent portion of the video data.

The adaptive entropy coding includes, in accordance with at least one of the updated probabilities in the second set being less than a threshold probability value, entropy coding (618) a subsequent portion of the video data in accordance with the updated first set. The adaptive entropy coding includes, in accordance with each of the updated probabilities in the second set being at least the threshold probability value, entropy coding (620) the subsequent portion of the video data in accordance with a first aggregation of the updated first and second sets.

In some embodiments, a convention of weighing the individual hypothesis is pre-defined for multi-hypothesis probability models. In some embodiments, when updating the probability of individual-hypothesis during entropy coding for a syntax R, candidate probability updates are tested, and if the candidate probability updates yield probability values $[\acute{p}_0, \acute{p}_1, \ldots, \acute{p}_k, \ldots \acute{p}_M]$ for a symbol in $[s_0, s_1, \ldots, s_k, \ldots s_M]$ where at least one $\acute{p}_k$ is lower than a pre-defined minimum probability value $P_{thr}$, the weight for that particular individual hypothesis will be assigned zero and henceforth that particular individual hypothesis will not be used for encoding/decoding the syntax.

In some embodiments, for a two-hypothesis model involving one hypothesis with a faster update rate and one with a slower update rate, a weighted average of the probability updates is used for entropy coding the syntax R until the hypothesis with faster update rate has at least one $\acute{p}_k$ lower than a pre-defined minimum probability value $P_{thr}$. Once the condition is met, only the hypothesis with slower update rate is used for entropy coding the syntax R.

In some embodiments, for a two-hypothesis model involving one hypothesis with a faster update rate and one with a slower update rate, when each of two hypotheses has at least one $\acute{p}_k$ lower than a pre-defined minimum probability value $P_{thr}$, the hypothesis with slower update rate is not updated and is used for entropy coding the syntax R.

In some embodiments, for a two-hypothesis model involving one hypothesis with a faster update rate and one with a slower update rate, the weighted average of the probability updates is used for entropy coding the syntax R until the hypothesis with faster update rate has at least one $\acute{p}_k$ lower than a pre-defined minimum probability value $P_{thr}$. Once the condition is met, another different weighting is applied to derive the weighted average of the probability updates.

In some embodiments, for a two-hypothesis model involving one hypothesis with a faster update rate and one with a slower update rate, the weighted average of the probability updates is used for entropy coding the syntax R until the hypothesis with faster update rate has at least one $\acute{p}_k$ lower than a pre-defined minimum probability value $P_{thr}$. Once the condition is met, the counter (introduced in section 2.3) used for calculating the update rate is increased such that a bigger window and a slower update rate is used.

In some embodiments, the adaptive entropy coding is only performed on a subset of the plurality of syntax elements. In some embodiments, the probability/hypothesis is adjusted when an updated probability is lower than a pre-defined minimum probability only for selected syntax elements. In some embodiments, the probability adjustment method (when the updated probability is lower than a pre-defined minimum probability) is only applied for syntax elements with less than or equal to N symbols. Example values of N include, but not limited to 2, 4, 6, 8, 10, 12.

In some embodiments, whether the probability adjustment method (when the updated probability is lower than a pre-defined minimum probability) is applied is specified by a flag for each syntax or a group of syntaxes, and the flag can be signaled in high-level syntax.

Although FIG. 6 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that various stages could be implemented in hardware, firmware, software, or any combination thereof.

Turning now to some example embodiments. In the following, R corresponds to a M-ary syntax element with symbol space $\varepsilon$ $[s_0, s_1, \ldots, s_k, \ldots s_M]$, probabilities $\varepsilon$ $[p_0, p_1, \ldots, p_k, \ldots p_M]$. M can take values including, but not limited to, the range 2 to 16 and k<=M.

(A1) In one aspect, some embodiments include a method (e.g., the method 600) of video coding. In some embodiments, the method is performed at a computing system (e.g., the server system 112) having memory and control circuitry. In some embodiments, the method is performed at a coding module (e.g., the coding module 320). In some embodiments, the method is performed at an entropy coder (e.g., the entropy coder 214). In some embodiments, the method is performed at a parser (e.g., the parser 254). The method includes: (i) obtaining video data comprising a plurality of syntax elements, the plurality of syntax elements including a first syntax element with a corresponding alphabet of M elements; (ii) obtaining a first set of respective probabilities of occurrence for the M elements of the first syntax element; (iii) obtaining a second set of respective probabilities of occurrence for the M elements of the first syntax element; (iv) determining a predefined threshold probability value, wherein a first hypothesis with a probability value less than the predefined threshold probability value is used differently than a second hypothesis with probability values greater than the predefined threshold probability value during decoding of the first syntax element; (vi) updating the first set by determining updated probabilities of occurrence for the M elements in the first set in accordance with the first syntax element, where the first set is updated at a first rate; (vii) updating the second set by determining updated probabilities of occurrence for the M elements in the second set in accordance with the first syntax element, where the second set is updated at a second rate, faster than the first rate; and (viii) adaptively entropy coding a portion of the video data, including: (a) in accordance with at least one of the updated probabilities in the second set being less than the predefined threshold probability value, entropy coding the portion of the video data in accordance with the updated first set; and (b) in accordance with each of the updated probabilities in the second set being at least the predefined threshold probability value, entropy coding the portion of the video data in accordance with a first aggregation of the updated first and second sets. In some embodiments, the number of the M elements is in a range of 2 to 16. In some embodiments, the number of the M elements is greater than 16. In some embodiments, the range is predefined based on a coding protocol, standard, and/or configuration. In some embodiments, the method further includes entropy coding a first portion of the video data in accordance with an aggregation of the first and second sets; and while entropy coding the first portion of the video data, encountering a first syntax element, where the first and second set are updated in response to encountering the first syntax element.

(A2) In some embodiments of A1, entropy coding the portion of the video data in accordance with the updated first set comprises assigning a weight of zero to the updated second set in a second aggregation of the updated first and second sets. For example, the second aggregation is a weighted average of the updated first and second sets and the weight assigned to the updated second set is zero.

(A3) In some embodiments of A1 or A2, entropy coding the portion of the video data in accordance with the updated first set comprises not using the updated second set for entropy coding the portion. For example, the portion of the video data is entropy coded using only the updated first set.

(A4) In some embodiments of any of A1-A3, the threshold probability value is selected from a set of threshold probability values based on one or more properties of the first syntax element. For example, the threshold probability value may be based on the number of the M elements.

(A5) In some embodiments of any of A1-A4, the method further includes, in accordance with at least one of the updated probabilities in the second set being less than the threshold probability value and in accordance with at least one of the updated probabilities in the first set being less than the threshold probability value: (i) discarding the updated first set; and (ii) entropy coding the portion of the video data in accordance with the first set. For example, if both updated sets include a probability below the threshold probability value, second coding uses the first set without any updating applied.

(A6) In some embodiments of any of A1-A5, entropy coding the portion of the video data in accordance with the updated first set comprises entropy coding the portion of the video data in accordance with a second aggregation of the updated first and second sets, where the second aggregation involves a different weighting than the first aggregation. For example, the second set is downweighted in accordance with one of its elements having a probability below the threshold probability value.

(A7) In some embodiments of any of A1-A6, the method further includes, in accordance with at least one of the updated probabilities in the second set being less than the threshold probability value, decreasing an update rate of the second set. For example, the second set is updated at a lower rate to prevent the probability of any of its elements from approaching zero as quickly.

(A8) In some embodiments of any of A1-A7, the plurality of syntax elements includes a second syntax element having a corresponding alphabet of N elements, and the method further includes: (i) obtaining a first set of respective probabilities of occurrence for the N elements of the second syntax element; (ii) obtaining a second set of respective probabilities of occurrence for the N elements of the second syntax element; (iii) while entropy coding a first portion of the video data, encountering the second syntax element; (iv) updating the first set of respective probabilities of occurrence for the N elements by determining updated probabilities of occurrence for the N elements in the first set in accordance with the second syntax element; (v) updating the second set of respective probabilities of occurrence for the N elements by determining updated probabilities of occurrence for the N elements in the second set in accordance with the second syntax element; and (vi) entropy coding a second portion of the video data in accordance with an aggregation of the updated first and second sets of respective probabilities of occurrence for the N elements. In some embodiments, N is greater than M. In some embodiments, N is greater than a threshold number (e.g., 16, 12, or 10) and M is less than or equal to the threshold number.

(A9) In some embodiments of any of A1-A8, the portion of the video data is adaptively entropy coded in accordance with M being less than a threshold number. For example, M is less than 16, 12, or 10.

(A10) In some embodiments of A9, the method further includes, in accordance with M being greater than the threshold number, forgoing adaptively entropy coding the portion of the video data. In some embodiments, in accordance with M being greater than the threshold number, the portion of the video data is coded using the first aggregation of the updated first and second sets.

(A11) In some embodiments of any of A1-A10, the portion of the video data is adaptively entropy coded in accordance with metadata associated with a first syntax element enabling use of adaptive entropy coding. For example, a flag associated with the first syntax element indicates whether to use adaptive entropy coding.

The methods described herein may be used separately or combined in any order. Each of the methods may be implemented by processing circuitry (e.g., one or more processors or one or more integrated circuits). In some embodiments, the processing circuitry executes a program that is stored in a non-transitory computer-readable medium.

The term "block" may be interpreted as a prediction block, a coding block, or a coding unit (CU). In some embodiments, the term "block" is used refer to a transform block. The term "block size" refers to either the block width or height, a maximum value of width and height, minimum of width and height, an area size (width*height), and/or an aspect ratio (width:height or height:width) of the block. A faster update rate refers to a bigger value of update rate, and/or a smaller probability update window size. A slower update rate refers to a smaller value of update rate, and/or a larger probability update window size.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A11 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A11 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video coding performed at a computing system having memory and one or more processors, the method comprising:
   obtaining video data comprising a plurality of syntax elements, the plurality of syntax elements including a first syntax element with a corresponding alphabet of M elements;
   obtaining a first set of respective probabilities of occurrence for the M elements of the first syntax element;
   obtaining a second set of respective probabilities of occurrence for the M elements of the first syntax element;
   determining a predefined threshold probability value, wherein a first hypothesis with a probability value less than the predefined threshold probability value is used differently than a second hypothesis with probability values greater than the predefined threshold probability value during decoding of the first syntax element;
   updating the first set by determining updated probabilities of occurrence for the M elements in the first set in accordance with the first syntax element, wherein the first set is updated at a first rate;
   updating the second set by determining updated probabilities of occurrence for the M elements in the second set in accordance with the first syntax element, wherein the second set is updated at a second rate, faster than the first rate; and
   adaptively entropy coding a portion of the video data, including:
      in accordance with at least one of the updated probabilities in the second set being less than the predefined threshold probability value, entropy coding the portion of the video data in accordance with the updated first set; and
      in accordance with each of the updated probabilities in the second set being at least the predefined threshold probability value, entropy coding the portion of the video data in accordance with a first aggregation of the updated first and second sets.

2. The method of claim 1, wherein entropy coding the portion of the video data in accordance with the updated first set comprises assigning a weight of zero to the updated second set in a second aggregation of the updated first and second sets.

3. The method of claim 1, wherein entropy coding the portion of the video data in accordance with the updated first set comprises not using the updated second set for entropy coding the portion.

4. The method of claim 1, wherein the threshold probability value is selected from a set of threshold probability values based on one or more properties of the first syntax element.

5. The method of claim 1, further comprising, in accordance with at least one of the updated probabilities in the second set being less than the threshold probability value and in accordance with at least one of the updated probabilities in the first set being less than the threshold probability value:
   discarding the updated first set; and
   entropy coding the portion of the video data in accordance with the first set.

6. The method of claim 1, wherein entropy coding the portion of the video data in accordance with the updated first set comprises entropy coding the portion of the video data in accordance with a second aggregation of the updated first and second sets, wherein the second aggregation involves a different weighting than the first aggregation.

7. The method of claim 1, further comprising, in accordance with at least one of the updated probabilities in the second set being less than the threshold probability value, decreasing an update rate of the second set.

8. The method of claim 1, wherein the plurality of syntax elements includes a second syntax element having a corresponding alphabet of N elements, and the method further comprises:
   obtaining a first set of respective probabilities of occurrence for the N elements of the second syntax element;
   obtaining a second set of respective probabilities of occurrence for the N elements of the second syntax element;
   updating the first set of respective probabilities of occurrence for the N elements by determining updated probabilities of occurrence for the N elements in the first set in accordance with the second syntax element;
   updating the second set of respective probabilities of occurrence for the N elements by determining updated probabilities of occurrence for the N elements in the second set in accordance with the second syntax element; and
   entropy coding the portion of the video data in accordance with an aggregation of the updated first and second sets of respective probabilities of occurrence for the N elements.

9. The method of claim 1, wherein the portion of the video data is adaptively entropy coded in accordance with M being less than a threshold number.

10. The method of claim 9, further comprising, in accordance with M being greater than the threshold number, forgoing adaptively entropy coding the portion of the video data.

11. The method of claim 1, wherein the portion of the video data is adaptively entropy coded in accordance with metadata associated with a first syntax element enabling use of adaptive entropy coding.

12. A computing system, comprising:
   control circuitry;
   memory; and
   one or more sets of instructions stored in the memory and configured for execution by the control circuitry, the one or more sets of instructions comprising instructions for:
      obtaining video data comprising a plurality of syntax elements, the plurality of syntax elements including a first syntax element with a corresponding alphabet of M elements;
      obtaining a first set of respective probabilities of occurrence for the M elements of the first syntax element;
      obtaining a second set of respective probabilities of occurrence for the M elements of the first syntax element;
      determining a predefined threshold probability value, wherein a first hypothesis with a probability value less than the predefined threshold probability value is used differently than a second hypothesis with probability values greater than the predefined threshold probability value during decoding of the first syntax element;

updating the first set by determining updated probabilities of occurrence for the M elements in the first set in accordance with the first syntax element, wherein the first set is updated at a first rate;

updating the second set by determining updated probabilities of occurrence for the M elements in the second set in accordance with the first syntax element, wherein the second set is updated at a second rate, faster than the first rate; and adaptively entropy coding a portion of the video data, including:

in accordance with at least one of the updated probabilities in the second set being less than the predefined threshold probability value, entropy coding the portion of the video data in accordance with the updated first set; and in accordance with each of the updated probabilities in the second set being at least the predefined threshold probability value, entropy coding the portion of the video data in accordance with a first aggregation of the updated first and second sets.

13. The computing system of claim 12, wherein entropy coding the portion of the video data in accordance with the updated first set comprises not using the updated second set for entropy coding the portion.

14. The computing system of claim 12, wherein entropy coding the portion of the video data in accordance with the updated first set comprises entropy coding the portion of the video data in accordance with a second aggregation of the updated first and second sets, wherein the second aggregation involves a different weighting than the first aggregation.

15. The computing system of claim 12, wherein the one or more sets of instructions further comprise instructions for, in accordance with at least one of the updated probabilities in the second set being less than the threshold probability value, decreasing an update rate of the second set.

16. The computing system of claim 12, wherein the portion of the video data is adaptively entropy coded in accordance with M being less than a threshold number.

17. A non-transitory computer-readable storage medium storing one or more sets of instructions configured for execution by a computing device having control circuitry and memory, the one or more sets of instructions comprising instructions for:

obtaining video data comprising a plurality of syntax elements, the plurality of syntax elements including a first syntax element with a corresponding alphabet of M elements;

obtaining a first set of respective probabilities of occurrence for the M elements of the first syntax element;

obtaining a second set of respective probabilities of occurrence for the M elements of the first syntax element;

determining a predefined threshold probability value, wherein a first hypothesis with a probability value less than the predefined threshold probability value is used differently than a second hypothesis with probability values greater than the predefined threshold probability value during decoding of the first syntax element;

updating the first set by determining updated probabilities of occurrence for the M elements in the first set in accordance with the first syntax element, wherein the first set is updated at a first rate;

updating the second set by determining updated probabilities of occurrence for the M elements in the second set in accordance with the first syntax element, wherein the second set is updated at a second rate, faster than the first rate; and adaptively entropy coding a portion of the video data, including:

in accordance with at least one of the updated probabilities in the second set being less than the predefined threshold probability value, entropy coding the portion of the video data in accordance with the updated first set; and in accordance with each of the updated probabilities in the second set being at least the predefined threshold probability value, entropy coding the portion of the video data in accordance with a first aggregation of the updated first and second sets.

18. The non-transitory computer-readable storage medium of claim 17, wherein entropy coding the portion of the video data in accordance with the updated first set comprises not using the updated second set for entropy coding the portion.

19. The non-transitory computer-readable storage medium of claim 17, wherein entropy coding the portion of the video data in accordance with the updated first set comprises entropy coding the portion of the video data in accordance with a second aggregation of the updated first and second sets, wherein the second aggregation involves a different weighting than the first aggregation.

20. The non-transitory computer-readable storage medium of claim 17, wherein the one or more sets of instructions further comprise instructions for, in accordance with at least one of the updated probabilities in the second set being less than the threshold probability value, decreasing an update rate of the second set.

* * * * *